United States Patent
Damle et al.

(10) Patent No.: US 9,690,344 B2
(45) Date of Patent: Jun. 27, 2017

(54) SYSTEM AND METHOD FOR A POWER SEQUENCING CIRCUIT

(71) Applicant: STMicroelectronics International N.V., Schiphol (NL)

(72) Inventors: Pratik Damle, Ghaziabad (IN); Gaurav Mathur, Greater Noida (IN); Vikram Singh, Radaur (IN)

(73) Assignee: STMICROELECTRONICS INTERNATIONAL N.V., Schiphol (NL)

( * ) Notice: Subject to any disclaimer, the term of this patent is extended or adjusted under 35 U.S.C. 154(b) by 205 days.

(21) Appl. No.: 14/516,381

(22) Filed: Oct. 16, 2014

(65) Prior Publication Data
US 2016/0109933 A1  Apr. 21, 2016

(51) Int. Cl.
G06F 1/26 (2006.01)
G06F 1/30 (2006.01)
G06F 1/32 (2006.01)

(52) U.S. Cl.
CPC .............. *G06F 1/263* (2013.01); *G06F 1/30* (2013.01); *G06F 1/3203* (2013.01)

(58) Field of Classification Search
None
See application file for complete search history.

(56) References Cited

U.S. PATENT DOCUMENTS

| | | | | |
|---|---|---|---|---|
| 5,659,207 A | * | 8/1997 | Chang | H02J 9/062 307/44 |
| 5,894,413 A | * | 4/1999 | Ferguson | H02J 1/10 307/43 |
| 6,058,039 A | * | 5/2000 | Abe | G06F 1/26 365/52 |
| 7,337,342 B1 | * | 2/2008 | O'Brien | G06F 1/26 713/300 |
| 2006/0087349 A1 | * | 4/2006 | Bird | H02M 1/08 327/112 |
| 2008/0047025 A1 | * | 2/2008 | Kim | G06F 21/554 726/35 |
| 2015/0054451 A1 | * | 2/2015 | Rokusek | H02M 7/23 320/108 |

* cited by examiner

*Primary Examiner* — Kim Huynh
*Assistant Examiner* — Paul J Yen
(74) *Attorney, Agent, or Firm* — Slater Matsil, LLP

(57) ABSTRACT

An embodiment is a circuit including a main power supply coupled to a first node, a charge reservoir coupled between a second node and ground, an isolation circuit coupled between the first node and the second node, and a plurality of secondary power supplies coupled to the second node, the plurality of secondary power supplies configured to receive power from the main power supply. The circuit further includes a detector circuit coupled to the first node, the detector circuit configured to detect the presence and absence of a first supply voltage at the first node, and a timing circuit coupled between the detector circuit and the plurality of secondary power supplies, the timing circuit configured to enable and disable the plurality of secondary power supplies in predetermined sequences based on the detection of the first supply voltage by the detector circuit.

21 Claims, 2 Drawing Sheets

SYSTEM AND METHOD FOR A POWER SEQUENCING CIRCUIT

TECHNICAL FIELD

The present invention relates generally to multiple power supply systems and, in particular to a design for a power sequencing circuit for a multiple power supply system.

BACKGROUND

In certain electrical systems, such as mobile, signal processing, computer, and communication systems, different parts of the system may be designed to be powered from different power sources. For example, a system may include a first component designed to operate with a 1.2 volt (V) source, a second component designed to operate with a 1.8 V source, and a third component designed to operate with a 3.3 V source. Typically the various components of the system have a desired sequence when initially powering up and powering down. However, in the conventional systems, if the main power source is abruptly turned off, the power down sequence is not followed which may result in malfunction/damage of the various components.

SUMMARY OF THE INVENTION

An embodiment is a circuit including a main power supply coupled to a first node, a charge reservoir coupled between a second node and ground, an isolation circuit coupled between the first node and the second node, and a plurality of secondary power supplies coupled to the second node, the plurality of secondary power supplies configured to receive power from the main power supply. The circuit further includes a detector circuit coupled to the first node, the detector circuit configured to detect the presence and absence of a first supply voltage at the first node, and a timing circuit coupled between the detector circuit and the plurality of secondary power supplies, the timing circuit configured to enable and disable the plurality of secondary power supplies in predetermined sequences based on the detection of the first supply voltage by the detector circuit.

Another embodiment is a power sequencing circuit including a main power supply configured to supply a first supply voltage to a first node, a charge reservoir configured to be charged by at least a portion of the first supply voltage, a plurality of voltage regulators configured to receive at least a portion of the first supply voltage; and a detector circuit having two control inputs and two outputs, a first control input coupled to the first node and a second control input coupled to ground, and a first output coupled to a second node and the second output coupled to a third node, the detector circuit configured to determine the status of the first supply voltage at the first node and couple voltages to the second and third nodes based on the determined status of the first supply voltage. The power sequencing circuit further includes a plurality of timing circuits, each of the plurality of timing circuits coupled to the second and third nodes and an enable pin of one of the plurality of voltage regulators, the plurality of timing circuits configured to enable and disable the plurality of voltage regulators in predetermined sequences based on the voltages at the second and third nodes.

A further embodiment is a method of operating a power sequencing circuit including providing a first power supply voltage to a first node by a main power supply, charging a charge reservoir with at least a portion of the first power supply voltage, supplying a plurality of voltage regulators with at least a portion of the first power supply voltage, and determining the status of the first power supply voltage at the first node by a detector circuit. The method further includes enabling a power-up sequence of the plurality of voltage regulators when the first power supply voltage is determined to be a high voltage at the first node, and isolating the main power supply from the charge reservoir and the plurality of voltage regulators and enabling a power-down sequence of the plurality of voltage regulators when the first power supply voltage is determined to be a low voltage at the first node.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

The making and using of the present embodiments are discussed in detail below. It should be appreciated, however, that the present disclosure provides many applicable inventive concepts that can be embodied in a wide variety of specific contexts. The specific embodiments discussed are merely illustrative of specific ways to make and use the disclosed subject matter, and do not limit the scope of the different embodiments.

Embodiments will be described with respect to embodiments in a specific context, namely a power sequencing circuit and a method of operating a power sequencing circuit. Some of the various embodiments described herein include a power sequencing circuit for use in a mobile handset, telecommunications, medical devices, imaging devices, computers, or any system which can utilize a power sequencing circuit. In other embodiments, aspects may also be applied to other applications involving any type of power sequencing circuit according to any fashion known in the art.

In general terms, using embodiments of the present disclosure, devices can leverage a power sequencing system that maintains the power down sequencing of secondary power supplies even when the main power supply is removed and/or unexpectedly turned off. In particular, the present disclosure utilizes a power sequencing system with a main power supply detector, charge reservoir, isolation circuit, timing generator circuit, and multiple secondary power supplies to implement the power-up and power-down sequences for various components/circuits of the system. In the event that the main power supply is turned off, the isolation circuit isolates the main power supply from the secondary power supplies so that the charge reservoir does not discharge through the main power supply and the charge reservoir maintains the power to the power sequencing circuit and secondary power supplies during the power down sequence. In addition, the main power supply detector detects this event and signals the timing generator circuit to begin the power-down sequence of the secondary power supplies. This allows for the secondary power supplies to maintain the power down sequencing even when the main power supply is turned off, which may prevent malfunction/damage of the various components/circuits powered by the secondary power supplies. The timing of the power-up and power-down sequences for each of the components/circuits may be independently configured and there is no limit to number of secondary power supplies that can be sequentially turned off/on with the power sequencing circuit.

Figure 1:
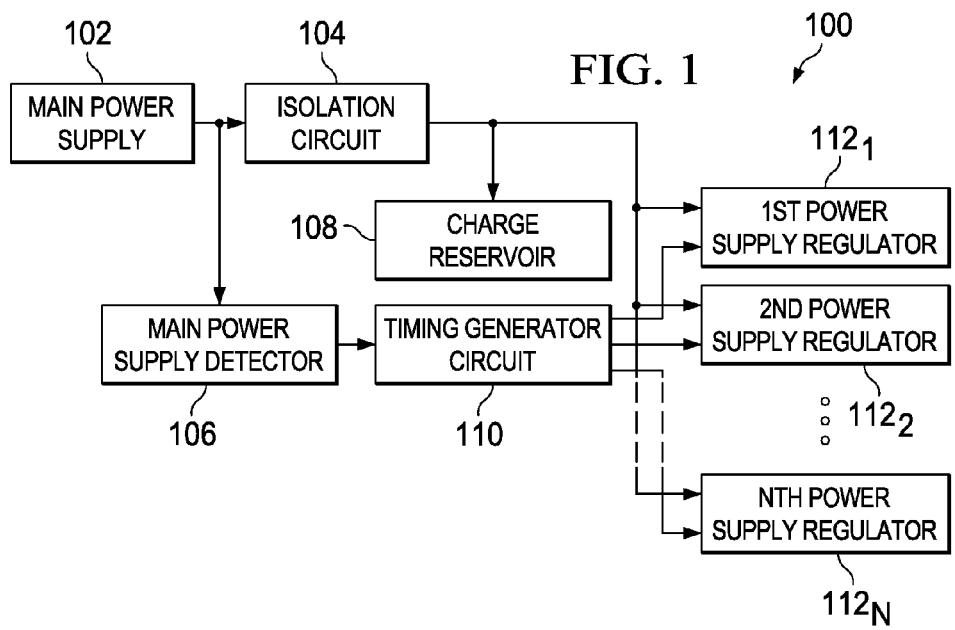
FIG. 1 is a block diagram of a power sequencing circuit in accordance with an embodiment.

FIG. 1 is a block diagram of a power sequencing system 100 in accordance with an embodiment. The power sequencing system 100 includes a main power supply 102, an isolation circuit 104, a main power supply detector 106, a charge reservoir 108, a timing generator circuit 110, and one or more power supply regulators 112 ($112_1$, $112_2$, and $112_N$). The components and blocks of FIG. 1 are shown merely by way of illustration. Other power sequencing system implementations may contain more or fewer components/blocks. In particular, the embodiments of the present disclosure can be implemented in other applications of power supplies.

The main power supply 102 supplies the power for the power sequencing system 100 and the components (not shown) that are coupled to the power supply regulators 112. In some embodiments, the main power supply is direct current (DC) power supply 102, such as an AC-to-DC power supply, a linear regulator, a battery, the like, or a combination thereof. The main power supply 102 may be external to or integrated with the power sequencing system 100.

The isolation circuit 104 isolates the main power supply 102 from the charge reservoir 108 and the power supply regulators 112 during some modes of the power sequencing system 100. In other modes of the power sequencing system 100, the isolation circuit couples the main power supply 102 to the charge reservoir 108 and the power supply regulators 112. An input of the isolation circuit 104 is coupled to the output of the main power supply 102 and its output is coupled to the charge reservoir 108 and the power supply regulators 112.

The main power supply detector 106 detects the presence and/or absence of a supply voltage at the output of the main power supply 102 and changes the modes of the power sequencing system 100 accordingly. The main power supply detector 106 changes the modes of the power sequencing system 100 by controlling the timing generator circuit 110. For example, when the main power supply detector 106 detects the presence of the supply voltage from the main power supply 102 (e.g. main power supply 102 turned on), the main power supply detector 106 controls the timing generator circuit 110 to begin the power-up sequence to enable the power supply regulators 112 in a specified sequence. When the main power supply detector 106 detects the absence of the supply voltage from the main power supply 102 (e.g. main power supply 102 turned off), the main power supply detector 106 controls the timing generator circuit 110 to begin the power-down sequence to disable the power supply regulators 112 in a specified sequence. In some embodiments, the power-down sequence is reversed from the power-up sequence. The absence of the supply voltage from the main power supply 102 may be because the main power supply 102 was turned off, unplugged, malfunctioned, or the like.

The charge reservoir 108 is capable of supplying the power to the power supply regulators 112 for a sufficient duration to allow the power-down sequence of the timing generator circuit 110 to complete. For example, when the main power supply 102 is turned off (e.g. when the main power supply detector 106 detects the absence of supply voltage of main power supply 102), the charge reservoir 108 supplies power to the powers supply regulators 112 during the power-down sequence. The charge reservoir 108 may be charged by the main power supply 102 when the supply voltage of the main power supply 102 is present.

The timing generator circuit 110 enables and disables the power supply regulators 112, in a predetermined order, based on the status of the main power supply detector 106. For example, if the main power supply detector 106 has detected the presence of the supply voltage from the main power supply 102, the timing generator circuit 110 begins the power-up sequence for the power supply regulators 112 (e.g. enables the power supply regulators 112 in a predetermined order). If the main power supply detector 106 has detected the absence of the supply voltage from the main power supply 102, the timing generator circuit 110 begins the power-down sequence for the power supply regulators 112 (e.g. disables the power supply regulators 112 in a predetermined order).

The power supply regulators 112 ($112_1$, $112_2$, and $112_N$) may have voltage outputs that are coupled to other components/circuits (not shown). For example, the power sequencing system 100 may be a part of a microprocessor and the power supply regulator $112_1$ may be coupled to a logic core, the power supply regulator $112_2$ may be coupled to input/output (I/O) circuits, and the power supply regulator $112_N$ may be coupled to peripheral circuits. In this example, each of the components/circuits coupled to the power supply regulators 112 may require a different power supply voltage level. Further, the components may have a specific power-up and power-down sequences to ensure that they function properly. For example, the logic core may need to be powered-up before the I/O circuits and the peripheral circuits to ensure normal operation. This is merely an example and not intended to be limiting as the power sequencing system may be applied to any system that utilizes multiple power domains and particular power-up and power-down sequences for these domains.

Figure 2:
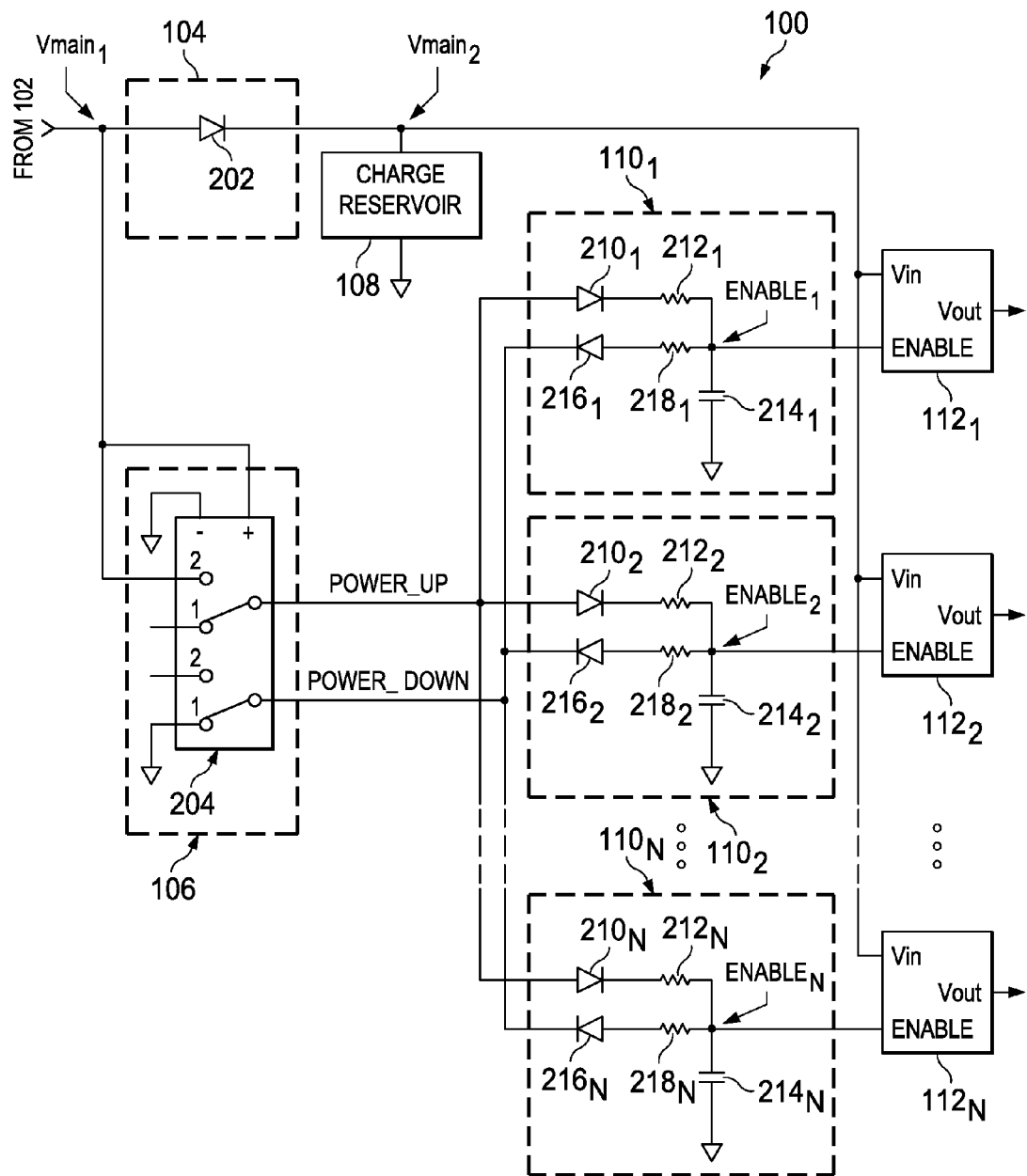
FIG. 2 is a schematic diagram of a power sequencing circuit in accordance with an embodiment.

FIG. 2 is a schematic diagram of the power sequencing system 100 according to an embodiment. In this embodiment, the isolation circuit 104 includes a diode 202 coupled between the main power supply 102 at node $Vmain_1$ and the charge reservoir 108 and the powers supply regulators 112 ($112_1$, $112_2$, and $112_N$) at node $Vmain_2$. The anode of the diode 202 is coupled to the node $Vmain_1$ and the cathode of the diode 202 is coupled to the node $Vmain_2$.

The node $Vmain_1$ is the voltage supplied by the main power supply 102. The node $Vmain_2$ is either $Vmain_1$ minus the diode drop of the diode 202 or the output voltage of the charge reservoir 108 depending on the status of the main power supply 102 as discussed further below. The diode 202 allows for main power supply 102 to charge the charge reservoir 108 and to supply power to the power supply regulators 112 when the main power supply 102 is ON (high voltage). However, when the main power supply 102 is OFF (low voltage), the diode 202 isolates the main powers supply 102 from the charge reservoir 108 and the power supply regulators 112 so that the charge reservoir 108 does not discharge through the main power supply 102.

The main power supply detector 106 may include a voltage-controlled double-pole, double-throw (DPDT) switch 204 (sometimes referred to as a DPDT relay). In an embodiment, the voltage-controlled DPDT switch 204 has control inputs (shown as + and − in FIG. 2), common nodes (coupled to the Power-Up and Power-Down nodes in FIG. 2), normally-closed (NC) nodes (shown as 1 in FIG. 2), and normally-open (NO) nodes (shown as 2 in FIG. 2).

In some embodiments, a first control input (+) of the voltage-controlled DPDT switch 204 is coupled to the node $Vmain_1$ and a second control input (−) is coupled to ground, a first common node is coupled to the Power-Up node, a second common node coupled to the Power-Down node, a first NC node that is floating (e.g. not coupled to ground or any reference voltage), a first NO node that is coupled to the node Vmain1, a second NC node that is coupled to ground, and a second NO node that is floating (e.g. not coupled to ground or any reference voltage). In these embodiments, the first common node can be switched between the first NC node and the first NO node and the second common node can be switched between the second NC node and the second NO node depending on the voltages at the control inputs. For example, if the voltage at the first control input (+) is a low voltage (e.g. about 0V) and the second control input is coupled to ground, both the first and second common nodes will be coupled to the first and second NC nodes, respectively. However, if the voltage at the first control input (+) is a high voltage (e.g. +5V) and the second control input is coupled to ground, both the first and second common nodes will be coupled to the first and second NO nodes, respectively. Hence, in this example, if the $Vmain_1$ node is a high voltage, then the Power-Up node will be coupled to $Vmain_1$ through the first common node and the first NO node and the Power-Down node will be floating through the second common node and the second NO node. In this example, if the $Vmain_1$ node is a low voltage, then the Power-Up node will be floating through the first common node and the first NC node and the Power-Down node will be coupled to ground through the second common node and the second NO node. Thus, in these examples, when $Vmain_1$ node is a high voltage, the Power-Up node will be a high voltage and the Power-Down node will be floating, and when the $Vmain_1$ node is a low voltage the Power-Up node will be floating and the Power-Down node will be grounded. The voltages at the Power-Up and Power-Down nodes determine the mode of the timing generator circuit 110 and will be discussed further below.

The charge reservoir 108 may include one or more capacitors. In an embodiment, charge reservoir 108 includes one or more bulk capacitors. In some embodiments, the charge reservoir includes multiple bulk capacitors connected in parallel. The charge reservoir 108 charges very quickly because the time constant for it is very small due to little or no resistance between the charge reservoir 108 and the main power supply 102. The charge reservoir 108 is capable of supplying the node $Vmain_2$ for a sufficient duration to allow the power-down sequence of the timing generator circuit 110 to complete.

FIG. 2 illustrates multiple timing generator circuits $110_1$, $110_2$, and $110_N$, with one timing generator circuit $110_1$, $110_2$, or $110_N$ for each of the power supply regulators $112_1$, $112_2$, and $112_N$. Each of the timing generator circuits of FIG. 2 may have similar components in similar arrangements, although the components may have different component values (e.g. resistance, capacitance, etc.).

In some embodiments, each of the timing generator circuits $110_1$, $110_2$, and $110_N$ have two different circuit legs. A first leg includes a diode 210 ($210_1$, $210_2$, and $210_N$) and a resistor 212 ($212_1$, $212_2$, and $212_N$) coupled in series between the Power-Up node and the Enable node ($Enable_1$, $Enable_2$, and $Enable_N$). A second leg includes a diode 216 ($216_1$, $216_2$, and $216_N$) and a resistor 218 ($218_1$, $218_2$, and $218_N$) coupled in series between the Power-Down node and the Enable node ($Enable_1$, $Enable_2$, and $Enable_N$). A capacitor 214 ($214_1$, $214_2$, and $214_N$) is coupled between each of the Enable nodes ($Enable_1$, $Enable_2$, and $Enable_N$) and ground. Each of the diodes 210 ($210_1$, $210_2$, and $210_N$) have their anodes coupled to the Power-Up nodes and their cathodes coupled to the resistor 212 ($212_1$, $212_2$, and $212_N$), and each of the diodes 216 ($216_1$, $216_2$, and $216_N$) have their anodes coupled to the resistor 218 ($218_1$, $218_2$, and $218_N$) and their cathodes coupled to the Power-Down node.

Each of the timing generator circuits $110_1$, $110_2$, and $110_N$ have two resistor-capacitor (RC) circuits that determine power-up and power-down timings of their respective power supply regulators $112_1$, $112_2$, and $112_N$. First RC circuits are on the first legs of the timing generator circuits $110_1$, $110_2$, and $110_N$ and include the diodes 210, the resistors 212, and the capacitors 214. The RC time constants of these first RC circuits determine the power-up timings of the power supply regulators 112. Second RC circuits are on the second legs of the timing generator circuits $110_1$, $110_2$, and $110_N$ and include the diodes 216, the resistors 218, and the capacitors 214. The RC time constants of these second RC circuits determine the power-down timings of the power supply regulators 112. The diodes 210 and 216 of the timing generator circuits 110 prevent the formation of undesired parallel resistor paths that would affect the RC time constants of the RC circuits. During a power-up sequence the diodes 216 are reverse-biased to prevent the second RC circuits from forming parallel paths with the first RC circuits which would affect the power-up timings of the power supply regulators 112. Similarly, during a power-down sequence the diodes 210 are reverse-biased prevent the first RC circuits from forming parallel paths with the second RC circuits which would affect the power-down timings of the power supply regulators 112.

For example, during the power-up sequence of the timing circuit $110_1$, the diode $210_1$ is forward-biased to begin the charging of the capacitor $214_1$ according to the RC time constant of the resistor $212_1$ and the capacitor $214_1$. In addition the diode $216_1$ will be forward-biased by the $Enable_r$ node, and thus, the diodes $216_2$ and $216_N$ being reverse-biased to the timing circuit $110_1$ prevent the second RC circuits of the timing circuits $110_2$ and $110_N$ from affecting the RC time constant of the timing circuit $110_1$. The timing circuits $110_2$ and $110_N$ work similarly in their power-up sequences with respect to the corresponding diodes 210 and 216.

During the power-down sequence of the timing circuit $110_1$, the diode $210_1$ is reverse-biased and the diode $216_1$ is forward-biased to begin the discharging of the capacitor $214_1$ according to the RC time constant of the resistor $218_1$ and the capacitor $214_1$. In addition the diodes $216_2$ and $216_N$ will be reverse-biased to the timing circuit $110_1$ to prevent the second RC circuits of the timing circuits $110_2$ and $110_N$ from affecting the RC time constant of the timing circuit $110_1$. The timing circuits $110_2$ and $110_N$ work similarly in their power-down sequences with respect to the corresponding diodes 210 and 216.

The power supply regulators 112 ($112_1$, $112_2$, and $112_N$) include voltage input (Vin) nodes that are coupled to the node $Vmain_2$, Enable nodes that are coupled to the Enable nodes ($Enable_1$, $Enable_2$, and $Enable_N$) of the timing generators circuits $110_1$, $110_2$, and $110_N$ and voltage output (Vout) nodes that may be coupled to other components/circuits (not shown). The power supply regulators 112 may be linear voltage regulators, low-dropout regulators (LDOs), the like, or any other suitable DC voltage regulator.

Each of the power supply regulators 112 may be designed to have a different value for Vout, or each of them may be designed to have a same value for Vout. The Enable nodes of the power supply regulators 112 enable or disable the respective power supply regulators 112 with a high voltage (e.g. +5V) at the Enable node enabling the respective power supply regulators 112. For example, as the voltage at the Enable node of the power supply regulators 112 starts rising per the RC time constant of the first RC circuit of the respective timing circuit 110, the corresponding power supply regulator 112 is enabled and turns on its voltage output Vout.

Although three timing generator circuits 110 and three power supply regulators 112 are shown in FIGS. 1 and 2, the powers sequencing system 100 may include any number of timing generator circuits 110 and power supply regulators 112.

In operation, when the main power supply 102 of the power sequencing system 100 of FIG. 2 is turned on (e.g. the node $Vmain_1$ transitions from a low voltage to a high voltage), the node $Vmain_1$ is a high voltage and the diode 202 of the isolation circuit is forward-biased. The $Vmain_2$ is a high voltage (e.g. $Vmain_2 = Vmain_1 - V_{Diode\ 202\ drop}$) and the charge reservoir 108 is charging and the voltage input (Vin) nodes of the power supply regulators 112 are a high voltage. The first control input (+) of the main power supply detector 106 is a high voltage and causes the Power-Up node to be a high voltage (the node $Vmain_1$ voltage) and the Power-Down node to be floating (e.g. both of the first and second common nodes of the voltage-controlled DPDT 204 are coupled to the first and second NO nodes). The capacitors 214 ($214_1$, $214_2$, and $214_N$) begin charging towards the $Vmain_1$ voltage, and thus, the voltages at the Enable nodes ($Enable_1$, $Enable_2$, and $Enable_N$) of the timing generator circuits $110_1$, $110_2$, and $110_N$ start rising toward the $Vmain_1$ voltage according to the RC time constants of their first RC circuits including the resistors 212 ($212_1$, $212_2$, and $212_N$) and capacitors 214 ($214_1$, $214_2$, and $214_N$). Thus, the voltage output (Vout) nodes of the power supply regulators 112 ($112_k$, $112_2$, and $112_N$) start turning on according to the voltages at the Enable nodes ($Enable_1$, $Enable_2$, and $Enable_N$). Once all of the power supply regulators 112 ($112_1$, $112_2$, and $112_N$) of the power sequencing system 100 are enabled, the power sequencing system 100 remains in this state as long as the voltage at node $Vmain_1$ remains a high voltage.

In operation, when the main power supply 102 of the power sequencing system 100 of FIG. 2 is turned off (e.g. the node $Vmain_1$ transitions from a high voltage to a low voltage), the node $Vmain_1$ is a low voltage and the diode 202 of the isolation circuit is reverse-biased. The reverse-biased diode 202 allows for the node $Vmain_1$ to be grounded or floating and the node $Vmain_2$ to remain at the output voltage of the charge reservoir 108. The $Vmain_2$ remains a high voltage (e.g. output voltage of charge reservoir 108) and the voltage input (Vin) nodes of the power supply regulators 112 remain a high voltage. The first control input (+) of the main power supply detector 106 is a low voltage and causes the Power-Up node to be floating and the Power-Down node to be grounded (e.g. both of the first and second common nodes of the voltage-controlled DPDT 204 are coupled to the first and second NC nodes). The capacitors 214 ($214_1$, $214_2$, and $214_N$) begin discharging to ground, and thus, the voltages at the Enable nodes ($Enable_1$, $Enable_2$, and $Enable_N$) of the timing generator circuits $110_1$, $110_2$, and $110_N$ start declining toward a low voltage according to the RC time constants of their second RC circuits including the resistors 218 ($218_1$, $218_2$, and $218_N$) and capacitors 214 ($214_1$, $214_2$, and $214_N$). Thus, the voltage output (Vout) nodes of the power supply regulators 112 ($112_1$, $112_2$, and $112_N$) start turning off according to the voltages at the Enable nodes ($Enable_1$, $Enable_2$, and $Enable_N$). The charge reservoir 108 is designed to maintain a sufficient voltage at node $Vmain_2$ to allow all of the power supply regulators 112 ($112_1$, $112_2$, and $112_N$) of the power sequencing system 100 to disable in their proper sequence.

As illustrated by the descriptions of the operations above, the power-up and the power-down sequences for each of the power supply regulators 112 ($112_1$, $112_2$, and $112_N$) is independently configurable based on the first and second RC circuits of the timing generator circuits $110_1$, $110_2$, and $110_N$. For example, if it were desired that the power supply regulators 112 ($112_1$, $112_2$, and $112_N$) turn on in order ($112_1 \rightarrow 112_2 \rightarrow 112_N$), then the RC time constant of the first RC circuit (resistor $212_1$ and capacitor $214_1$) of the timing generator circuit $110_1$ should be less than the RC time constant of the first RC circuit (resistor $212_2$ and capacitor $214_2$) of the timing generator circuit $110_2$, and the RC time constant of the first RC circuit (resistor $212_2$ and capacitor $214_2$) of the timing generator circuit $110_2$ should be less than the RC time constant of the first RC circuit (resistor $212_N$ and capacitor $214_N$) of the timing generator circuit $110_N$. This configuration of the RC time constants would achieve the desired power-up sequence of $112_1 \rightarrow 112_2 \rightarrow 112_N$.

Likewise, if it were desired that the power supply regulators 112 ($112_1$, $112_2$, and $112_N$) turn off in reverse order ($112_N \rightarrow 112_2 \rightarrow 112_1$), then the RC time constant of the second RC circuit (resistor $218_1$ and capacitor $214_1$) of the timing generator circuit $110_1$ should be greater than the RC time constant of the second RC circuit (resistor $218_2$ and capacitor $214_2$) of the timing generator circuit $110_2$, and the RC time constant of the second RC circuit (resistor $218_2$ and capacitor $214_2$) of the timing generator circuit $110_2$ should be greater than the RC time constant of the second RC circuit (resistor $218_N$ and capacitor $214_N$) of the timing generator circuit $110_N$. This configuration of the RC time constants would achieve the desired power-down sequence of $112_N \rightarrow 112_2 \rightarrow 112_1$.

The first and second RC circuits of each of the timing generator circuits $110_1$, $110_2$, and $110_N$ share their respective capacitors 214 ($214_1$, $214_2$, and $214_N$). Hence, the resistance values of the resistors 212 ($212_1$, $212_2$, and $212_N$) and 218 ($218_1$, $218_2$, and $218_N$) allow for a power supply regulator 112 to have a different location in the power-up sequence than its location in the power-down sequence. For example, the power-up sequence can be $112_1 \rightarrow 112_2 \rightarrow 112_N$ and the power-down sequence can be $112_N \rightarrow 112_2 \rightarrow 112_1$, which is the reverse of the power-up sequence. In this example, the resistance value of resistor $212_1$ would be less than the resistance value of $218_1$, the resistance value of resistor $212_2$ could be less than, greater than, or the same as the resistance value of $218_2$, and the resistance value of resistor $212_N$ would be greater than the resistance value of $218_N$.

The power sequencing system 100 enables a device to maintain the proper power down sequencing of secondary power supplies even when the main power supply is removed and/or unexpectedly turned off. In particular, the isolation circuit isolates the main power supply from the secondary power supplies so that the charge reservoir does not discharge through the main power supply and the charge reservoir maintains the power to the power sequencing circuit and secondary power supplies during the power down sequence. In addition, the main power supply detector detects this event and signals the timing generator circuit to begin the power-down sequence of the secondary power supplies. This allows for the secondary power supplies to maintain the power down sequencing even when the main power supply is turned off, which may prevent malfunction/damage of the various components/circuits powered by the secondary power supplies. The timing of the power-up and power-down sequences for each of the components/circuits may be independently configured and there is no limit to number of secondary power supplies that can be sequentially turned off/on with the power sequencing circuit.

Figure 3:
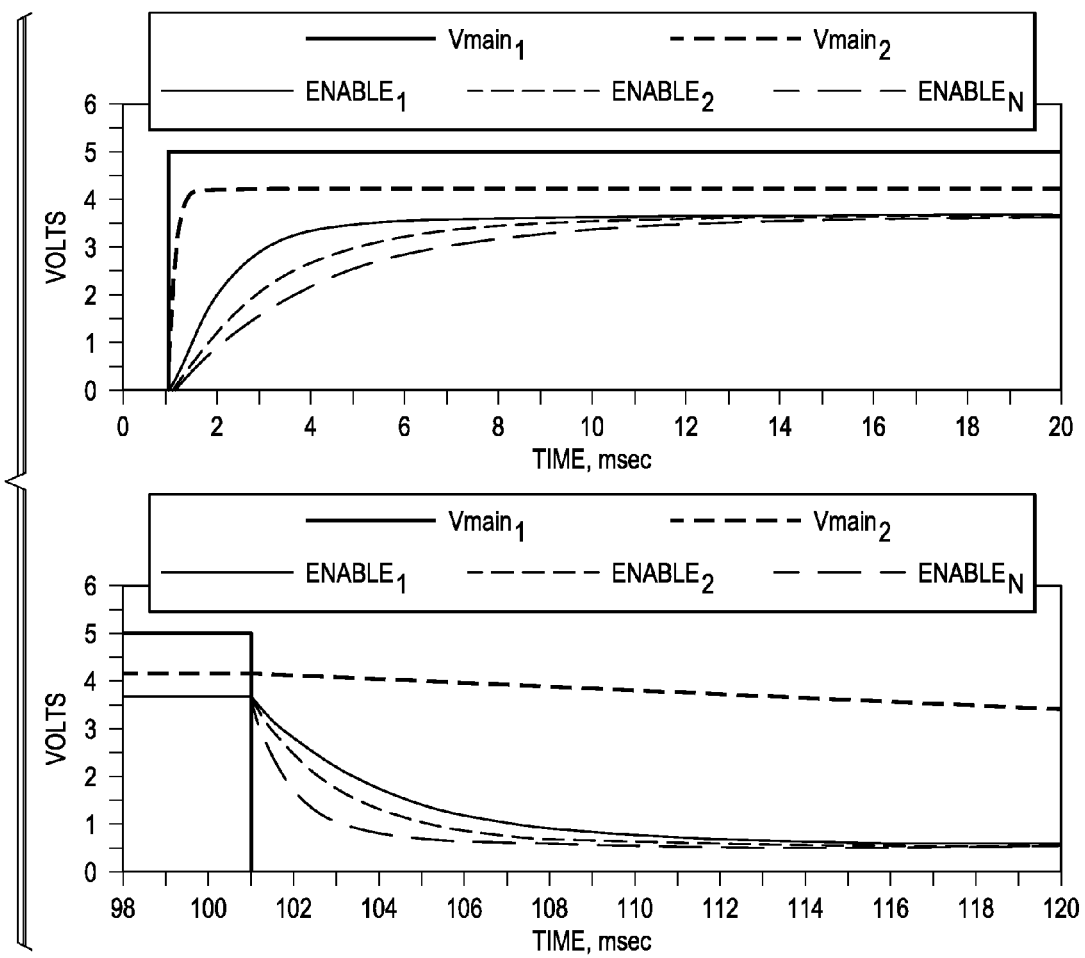
FIG. 3 is a timing diagram illustrating the operation of a power sequencing circuit in accordance with an embodiment.

FIG. 3 is a timing diagram illustrating the operation of the power sequencing system 100 in FIG. 2 in accordance with an embodiment. FIG. 3 includes two timing diagrams of voltage nodes over a period of time with the upper diagram illustrating the power-up sequence and the lower diagram illustrating the power-down sequence.

The upper and lower diagrams each include the voltage nodes $Vmain_1$, $Vmain_2$, $Enable_1$, $Enable_2$, and $Enable_N$. In the illustrated embodiment, the power-up sequence is designed to in the order $112_1 \rightarrow 112_2 \rightarrow 112_N$ and the power-down sequence is designed to be in the order $112_N \rightarrow 112_2 \rightarrow 112_1$, which is the reverse of the power-up sequence order.

The power-up sequence (upper timing diagram) illustrates the $Vmain_1$ transitioning to a high voltage (about +5 V) at about 1 millisecond (msec). The voltage at the node $Vmain_2$ charges the charge reservoir 108 and the node $Vmain_2$ becomes a high voltage (about +4.3V) which is the same as $Vmain_1$ less than diode drop of the diode 202. After the node Vmain2 is a high voltage, the voltages at the Enable (Enable$_1$, Enable$_2$, and Enable$_N$) nodes begin rising according the RC time constants of their respective timing generator circuits 110. In this embodiment, the node Enable$_1$ is asserted first, the node Enable$_2$ is asserted second, and the node Enable$_N$ is asserted third.

The power-down sequence (lower timing diagram) illustrates the $Vmain_1$ transitioning to a low voltage (about 0V) at about 101 msec. The voltage at the node $Vmain_2$ remains a high voltage (greater than about 4V) and discharges slowly to allow time for the power-down sequence to complete. After the node Vmain1 goes to a low voltage, the voltages at the Enable (Enable$_1$, Enable$_2$, and Enable$_N$) nodes begin declining according the RC time constants of their respective timing generator circuits 110. In this embodiment, the node Enable$_N$ is de-asserted first, the node Enable$_2$ is de-asserted second, and the node Enable$_1$ is de-asserted third. Note that the voltage $Vmain_2$ discharges at a slow enough rate to remain a high enough voltage to allow the Enable voltages to de-assert in their proper sequence.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A circuit comprising:
 a main power supply coupled to a first node;
 a charge reservoir coupled between a second node and a ground voltage;
 an isolation circuit coupled between the first node and the second node;
 a plurality of secondary power supplies coupled to the second node, the plurality of secondary power supplies configured to receive power from the main power supply;
 a detector circuit coupled to the first node, the detector circuit configured to detect the presence and absence of a first supply voltage at the first node; and
 a timing circuit coupled between the detector circuit and the plurality of secondary power supplies, the timing circuit comprising:
  a first resistor-capacitor (RC) circuit for each of the plurality of secondary power supplies, the first RC circuits being coupled between the detector circuit and one of the plurality of secondary power supplies; and
  a second RC circuit for each of the plurality of secondary power supplies, the second RC circuits being coupled between the detector circuit and one of the plurality of secondary power supplies, the first and second RC circuits each comprising:
   a diode and a resistor in series between the detector circuit and a respective one of the plurality of secondary power supplies; and
   a capacitor coupled between the respective one of the plurality of secondary power supplies and a ground voltage;
 wherein the detector circuit is further configured to:
  determine the status of the first supply voltage at the first node;
  couple a first input of the timing circuit to the first node and a second input of the timing circuit to a floating voltage when the first supply voltage at the first node is a high voltage; and
  couple the first input of the timing circuit to a floating voltage and the second input of the timing circuit to a ground voltage when the first supply voltage at the first node is a low voltage.

2. The circuit of claim 1, wherein the isolation circuit comprises a diode having an anode coupled to the first node and a cathode coupled to the second node.

3. The circuit of claim 1, wherein the detector circuit comprises a voltage-controlled double-pole, double-throw switch.

4. The circuit of claim 1, wherein the first RC circuits defining a predetermined sequence for enabling the plurality of secondary power supplies and the second RC circuits defining a predetermined sequence for disabling the plurality of secondary power supplies.

5. The circuit of claim 4, wherein the first and second RC circuits for a respective one of the plurality of secondary power supplies share a capacitor.

6. The circuit of claim 1, wherein the timing circuit is further configured to enable the plurality of secondary powers supplies in a first predetermined sequence and to disable the plurality of secondary power supplies in a second predetermined sequence, the second predetermined sequence being different than the first predetermined sequence.

7. The circuit of claim 6, wherein the second predetermined sequence is reverse from the first predetermined sequence.

8. The circuit of claim 1, wherein the timing circuit is further configured to begin a predetermined sequence of disabling the secondary power supplies when the detector circuit detects the absence of the first supply voltage at the first node.

9. The circuit of claim 8, wherein the charge reservoir is configured to provide power to the plurality of secondary power supplies during the predetermined sequence of disabling the plurality of secondary power supplies.

10. A power sequencing circuit comprising:
a main power supply configured to supply a first supply voltage to a first node;
a charge reservoir configured to be charged by at least a portion of the first supply voltage;
a plurality of voltage regulators configured to receive at least a portion of the first supply voltage;
a detector circuit having two control inputs and two outputs, a first control input coupled to the first node and a second control input coupled to a ground voltage, and a first output coupled to a second node and a second output coupled to a third node, the detector circuit configured to:
  determine the status of the first supply voltage at the first node and couple voltages to the second and third nodes based on the determined status of the first supply voltage;
  couple a floating voltage to the second node and a ground voltage to the third node when the first supply voltage at the first node is a low voltage; and
  couple the first supply voltage to the second node and a floating voltage to the third node when the first supply voltage at the first node is a high voltage; and
a plurality of timing circuits, each of the plurality of timing circuits coupled to the second and third nodes and an enable pin of one of the plurality of voltage regulators, the plurality of timing circuits configured to enable and disable the plurality of voltage regulators in predetermined sequences based on voltages at the second and third nodes.

11. The power sequencing circuit of claim 10, wherein each of the plurality of timing circuits further comprise:
a first leg coupled between the second node and the enable pin of the respective one of the plurality of voltage regulators;
a second leg coupled between the third node and the enable pin of the respective voltage regulator, the first and second legs each comprising a diode and a resistor; and
a capacitor coupled between the enable pin of the respective voltage regulator a and ground voltage.

12. The power sequencing circuit of claim 10, further comprising an isolation circuit between the first node and the charge reservoir.

13. The power sequencing circuit of claim 10, wherein the detector circuit comprises a voltage-controlled double-pole, double-throw switch.

14. The power sequencing circuit of claim 10, wherein the charge reservoir comprises one or more bulk capacitors.

15. The power sequencing circuit of claim 10, wherein the charge reservoir is further configured to provide power to the plurality of voltage regulators during the predetermined sequence of disabling the plurality of voltage regulators.

16. The power sequencing circuit of claim 10, wherein the timing circuit is further configured to enable the plurality of voltage regulators in a first predetermined sequence and to disable the plurality of voltage regulators in a second predetermined sequence, the second predetermined sequence being different than the first predetermined sequence.

17. A method of operating a power sequencing circuit comprising:
providing a first power supply voltage to a first node by a main power supply;
charging a charge reservoir with at least a portion of the first power supply voltage;
supplying a plurality of voltage regulators with at least a portion of the first power supply voltage;
determining the status of the first power supply voltage at the first node by a detector circuit;
when the first power supply voltage is determined to be a high voltage at the first node, enabling a power-up sequence of the plurality of voltage regulators by coupling a first input of a timing circuit to the first node and a second input to a floating voltage; and
when the first power supply voltage is determined to be a low voltage at the first node, isolating the main power supply from the charge reservoir and the plurality of voltage regulators, and enabling a power-down sequence of the plurality of voltage regulators by coupling the first input of the timing circuit to a floating voltage and the second input to a ground voltage.

18. The method of claim 17 further comprising:
supplying a second power supply voltage to the plurality of voltage regulators by the charge reservoir when the first power supply voltage is determined to be a low voltage at the first node.

19. The method of claim 17, wherein during the power-up sequence the plurality of voltage regulators are enabled in a first order, and wherein during power-down sequence the plurality of voltage regulators are disabled in a second order.

20. The method of claim 19, wherein the first order is different than the second order.

21. The method of claim 20, wherein the second order is a reverse of the first order.

* * * * *